United States Patent
Huang et al.

(10) Patent No.: US 10,638,562 B2
(45) Date of Patent: Apr. 28, 2020

(54) POWER CONVERTER, LED DRIVER AND CONTROL METHOD

(71) Applicant: Silergy Semiconductor Technology (Hangzhou) LTD, Hangzhou, ZheJiang Province (CN)

(72) Inventors: Qiukai Huang, Hangzhou (CN); Jianxin Wang, Hangzhou (CN); Qingliang Zheng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/210,102

(22) Filed: Dec. 5, 2018

(65) Prior Publication Data

US 2019/0191506 A1    Jun. 20, 2019

(30) Foreign Application Priority Data

Dec. 15, 2017  (CN) .............................. 2017 1 350949

(51) Int. Cl.
*H05B 33/00*   (2006.01)
*H05B 33/08*   (2020.01)

(52) U.S. Cl.
CPC ..... *H05B 33/0815* (2013.01); *H05B 33/0812* (2013.01); *H05B 33/0848* (2013.01); *Y02B 20/346* (2013.01)

(58) Field of Classification Search
CPC ............ H05B 33/0815; H05B 33/0845; H05B 39/044; H05B 39/048; H05B 33/0887; H05B 33/0818; H05B 33/0803; H05B 33/0857; H05B 39/04; H05B 33/0884; H05B 33/0809; H05B 33/089; H05B 33/0827; H05B 33/0842; H05B 33/0851; H05B 37/0218; H05B 37/0227; H05B 37/0272; H05B 37/0281
See application file for complete search history.

(56) References Cited

U.S. PATENT DOCUMENTS

| | | |
|---|---|---|
| 8,614,551 B2 | 12/2013 | Chen et al. |
| 9,125,270 B2 | 9/2015 | Liao et al. |
| 9,578,706 B1 | 2/2017 | Lai et al. |
| 2013/0241427 A1 | 9/2013 | Kesterson et al. |
| 2014/0062322 A1 | 3/2014 | Yu et al. |
| 2018/0100644 A1* | 4/2018 | Xiong ............... F21V 25/02 |
| 2019/0182918 A1* | 6/2019 | Huang |

FOREIGN PATENT DOCUMENTS

| | | |
|---|---|---|
| CN | 105979630 A | 9/2016 |
| WO | 2017012514 A1 | 1/2017 |

* cited by examiner

*Primary Examiner* — Monica C King
(74) *Attorney, Agent, or Firm* — Michael C. Stephens, Jr.

(57) ABSTRACT

A power converter for an LED driver, can include: an input capacitor circuit coupled between input terminals of the power converter and being configured to receive an output signal of a rectifier circuit; a transistor coupled in series with an LED load; and a control circuit configured to regulate a capacitance value of the input capacitor circuit to regulate an input current, and to control the transistor to regulate a current flowing through the LED load.

20 Claims, 6 Drawing Sheets

POWER CONVERTER, LED DRIVER AND CONTROL METHOD

RELATED APPLICATIONS

This application claims the benefit of Chinese Patent Application No. 201711350949.4, filed on Dec. 15, 2017, which is incorporated herein by reference in its entirety.

FIELD OF THE INVENTION

The present invention generally relates to the field of power electronics, and more particularly to LED drivers, along with associated power converters and control methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
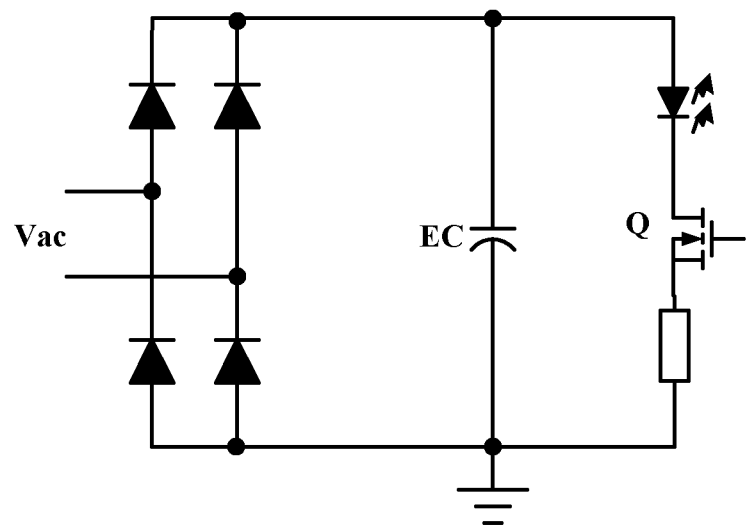
FIG. 1 is a schematic block diagram of an example LED driver.

Referring now to FIG. 1, shown is a schematic block diagram of an example LED driver. Light-emitting diode (LED) technology is widely used as a light source because of its relatively high optical efficiency, long life, and low power loss. As a constant current load, the LED load may be driven by a drive circuit capable of providing a constant current. Transistor Q connected in series with the LED load can operate in a linear region/state, such that the current flowing through the LED load can remain substantially constant. In a linear drive scheme, the output terminals of a rectifier circuit can be connected in parallel with capacitor EC. Since the rectifier circuit (e.g., full-bridge rectifier circuit) and the capacitor are nonlinear devices, when the capacitance value of the capacitor is relatively large, the conduction angle of diodes in the rectifier circuit may be narrowed, and the diodes can only be turned on near the peak value of alternating current (AC) input voltage Vac, which may result in relatively severe distortion of an input current of the rectifier circuit. The distorted current waveform can contain a large amount of harmonic components, which may adversely affect a power grid, and can significantly decrease an active power provided to the LED load. Particularly when the AC input voltage is increased, the input current may correspondingly be reduced such that the power factor can be greatly decreased.

In one embodiment, a power converter configured for an LED driver, can include: (i) an input capacitor circuit coupled between input terminals of the power converter and being configured to receive an output signal of a rectifier circuit; (ii) a transistor coupled in series with an LED load; and (iii) a control circuit configured to regulate a capacitance value of the input capacitor circuit to regulate an input current, and to control the transistor to regulate a current flowing through the LED load.

Figure 2:
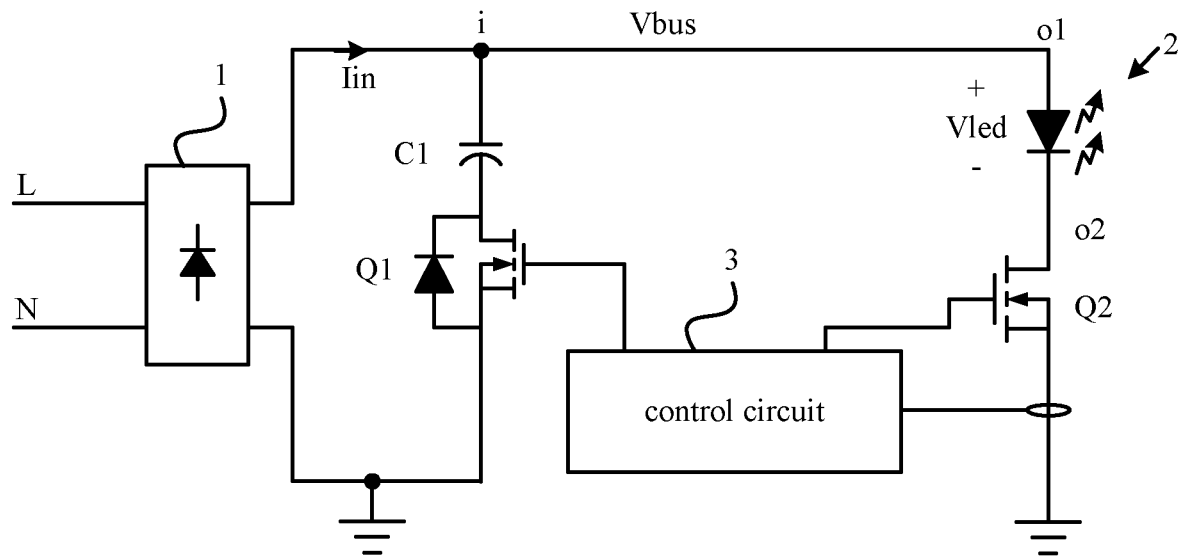
FIG. 2 is a schematic block diagram of a first example LED driver, in accordance with embodiments of the present invention.

Referring now to FIG. 2, shown is a schematic block diagram of a first example LED driver, in accordance with embodiments of the present invention. In this particular example, the LED driver can include rectifier circuit 1, and a power converter connected to rectifier circuit 1. The power converter can receive a direct current (DC) current generated by rectifier circuit 1 to drive the LED load. The power converter can include input terminal i, output ports o1 and o2, transistor Q2 and an input capacitor circuit including first capacitor C1 and switch Q1 and. For example, switch Q1 may be a metal-oxide-semiconductor field-effect transistor (MOSFET). It should be understood that other electronically controlled switch devices, such as a bipolar junction transistor (BJT) or an insulated gate bipolar transistor (IGBT), may additionally or alternatively be utilized as switch Q1. In addition, transistor Q2 may also be a MOSFET. It should be understood that other devices that can operate in a constant current state, such as a BJT or an IGBT, can also alternatively or additionally be utilized as transistor Q2. Rectifier circuit 1 may have one output terminal connected to input terminal i, and another output terminal connected to the ground. LED load 2 can connect between output ports o1 and o2. Capacitor C1 and switch Q1 can connect in series between input terminal i and ground. Control circuit 3 can control transistor Q2 to keep output current Iled flowing through the output ports as substantially constant, and to control an on-off state of switch Q1.

Rectifier circuit 1 can convert an alternating current (AC) input voltage to a direct current (DC) signal. In an ideal state, rectifier circuit 1 can convert the AC input voltage having a sinusoidal waveform into a sinusoidal half-wave voltage as a theoretical output voltage of rectifier circuit 1. However, the output voltage of rectifier circuit 1 may be different from the theoretical output voltage due to nonlinear characteristics of the subsequent stage circuit connected to rectifier circuit 1. Since the voltage on the capacitor may not be mutated, the voltage at input terminal i of the LED driver may not vary in real time with the sinusoidal half-wave voltage, and instead may have hysteresis and be affected by the subsequent stage circuit.

Thus, voltage Vbus (e.g., the input voltage of the LED driver) at input terminal i can be greater than the theoretical output voltage in some cases, thereby causing diodes of rectifier circuit 1 to be turned off. Under a larger capacitance value of the capacitor condition at the input terminal of the power converter, input voltage Vbus can vary slowly after a steady state of the circuit is established, thereby potentially causing input voltage Vbus to be greater than the theoretical output voltage of rectifier circuit 1 for most of the sinusoidal half-wave period. Thus, rectifier circuit 1 can generate input current Iin to the subsequent stage circuit only for a short time period (e.g., the time period close to the peak value of the AC input voltage) in each sinusoidal half-wave period. This can cause input current Iin of the LED driver to appear as spikes in the sinusoidal half-wave period, introducing a relatively large amount of harmonic components.

In particular embodiments, the capacitance value of the input capacitor circuit can be regulated. For example, when switch Q1 is controlled to be turned on, capacitor C1 is provided to the LED driver, the capacitance value of input terminal i of the power converter may increase, and the voltage generated by rectifier circuit 1 can be filtered. When switch Q1 is controlled to be turned off, capacitor C1 is disconnected from the LED driver and the capacitance value of input terminal i may be decreased. In addition, the input voltage at input terminal i can vary rapidly along with the output voltage of rectifier circuit 1. Rectifier circuit 1 can generate the input current to the LED driver. When switch Q1 is a transistor, capacitor C1 can be connected to the LED driver through a body diode of switch Q1 to be discharged in some cases.

In particular embodiments, during each power frequency half-wave period, switch Q1 can be controlled to be turned off for a predetermined time to reduce a time for charging the capacitor, such that the output terminal of the rectifier circuit has no capacitor or a capacitor with a relatively small capacitance value at the predetermined time. The predetermined time for turning off switch Q1 can be a constant predetermined value or a value that varies with parameters in the LED driver. Thus, an impedance for preventing the input voltage at the output terminal of rectifier circuit 1 from changing may be decreased, such that the conduction angle of the diodes of rectifier circuit 1 can be widened, thereby reducing the harmonic component in the input current waveform. In other words, in each power frequency half-wave period, capacitor C1 can effectively be connected to the LED driver to be charged for only a part of the period, in order to prevent the input voltage from changing, such that a phase difference between the input current and the input voltage is decreased, and the power factor of the LED driver can be improved. Furthermore, by controlling the on-off state of switch Q1, the distribution of input current Iin can be controlled and the efficiency of the LED driver may be improved.

Figure 3:
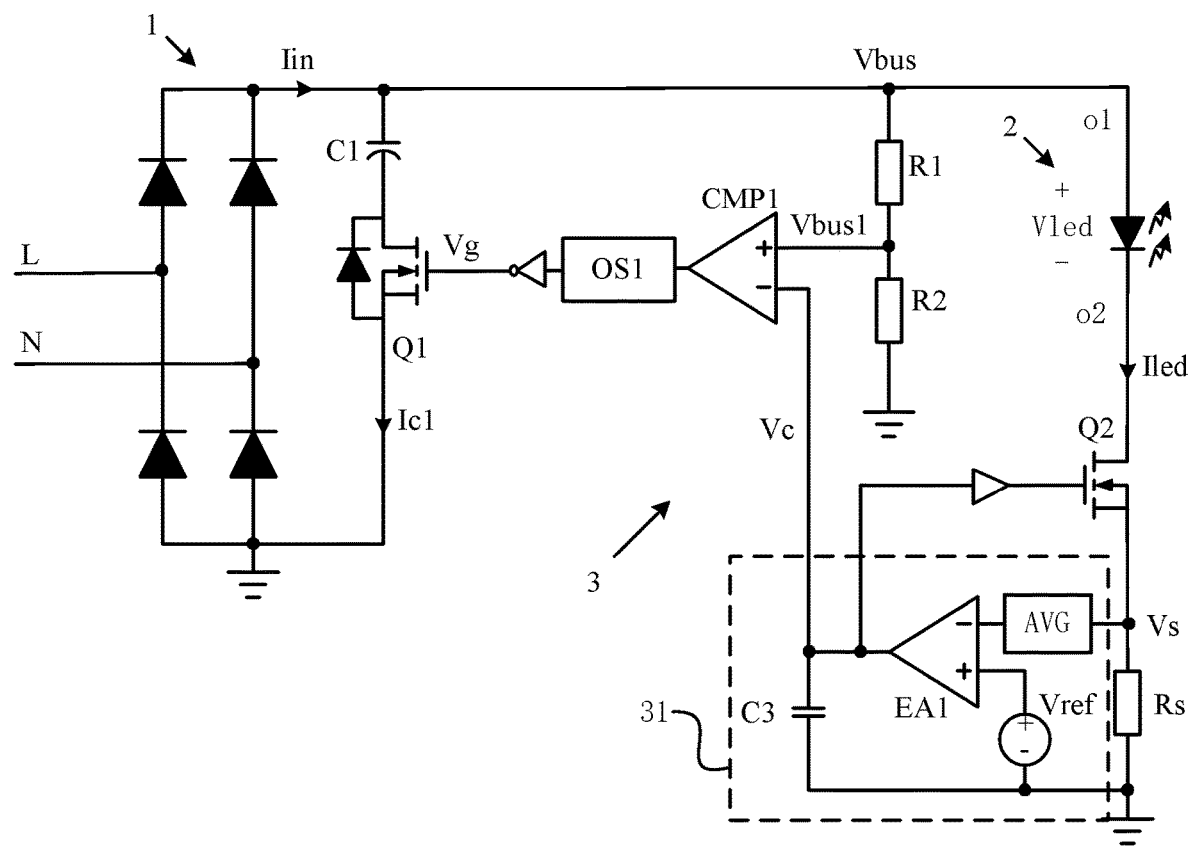
FIG. 3 is a schematic block diagram of a second example LED driver, in accordance with embodiments of the present invention.

Referring now to FIG. 3, shown is a schematic block diagram of a second example LED driver, in accordance with embodiments of the present invention. The LED driver can include capacitor C1 and switch Q1 connected in series. The capacitance value at input terminal i of the power converter may be switched between zero and the capacitance value of capacitor C1 by controlling switch Q1 to be turned on and off, such that the capacitor at input terminal i of the power converter is always present for charging, discharging, and filtering, in order to maintain the stability of the entire circuit.

In particular embodiments, control circuit 3 can control switch Q1 to be turned off for a predetermined time, such that in each power frequency half-wave period the input current is concentrated in a time period during which a voltage difference at the two power terminals of transistor Q2 is relatively small (e.g., the voltage difference between the input voltage and the output voltage of the power converter is relatively small). For example, transistor Q2 can operate in a variable resistance region or a constant current region to control output current Iled flowing through LED load 2 to be maintained as substantially constant. When switch Q1 is turned off, if an absolute value of the AC input voltage of rectifier circuit 1 is relatively high, rectifier circuit 1 can generate the input current to the LED driver, and the output current can simultaneously drive LED load 2 to emit. If the absolute value of the AC input voltage of rectifier circuit 1 is relatively low, rectifier circuit 1 may not generate the input current, and capacitor C1 can be discharged to drive LED load 2 through the body diode of switch Q1 or a unidirectional conduction circuit connected in parallel with switch Q1.

When switch Q1 is turned on, capacitor C1 may effectively be connected to the LED driver through switch Q1. If the absolute value of the AC input voltage of rectifier circuit 1 is relatively high, rectifier circuit 1 can charge capacitor C1 and generate the input current to drive LED load 2 to emit. If the absolute value of the AC input voltage of rectifier circuit 1 is relatively low, rectifier circuit 1 may not generate the input current, and capacitor C1 can be discharged to drive LED load 2. Since the output current flowing through LED load 2 is substantially constant, input current Iin of the LED driver may mainly be determined by the magnitude of a charging current of capacitor C1. When switch Q1 is turned on, capacitor C1 can be provided to the power converter, which can cause a significant increase in the input current.

Thus, by controlling the on-off state of switch Q1, the distribution of input current Iin can be controlled. The input current may be concentrated in the time period during which the voltage difference between input voltage Vbus and output voltage Vled is relatively small, such that a voltage drop across the remaining circuitry is relatively small, and the power consumption of the circuit is relatively small. Therefore, when switch Q1 is turned on during the above time period, rectifier circuit 1 can charge capacitor C1. After the above time period or after the voltage of capacitor C1 is increased to a certain voltage, switch Q1 may be turned off and capacitor C1 may not be charged, such that adverse effects of the relatively large capacitance on rectifier circuit 1 can be avoided. In this way, the harmonic distortion can be reduced, the power factor can be improved, the power consumption can be reduced, and the system efficiency of the circuit can be improved.

For example, control circuit 3 can control switch Q1 to turn on for at least part of time when the voltage difference between the two power terminals of transistor Q2 is less than a predetermined value, and absolute value |Vac| of the AC input voltage is not less than input voltage Vbus. When the voltage difference between the two power terminals of transistor Q2 is greater than the predetermined value, switch Q1 can be controlled to be turned off. On the one hand, this can ensure that transistor Q2 has a relatively small conduction voltage drop. On the other hand, the negative effect of the relatively large capacitor on the power factor can be reduced. Furthermore, transistor Q2 can operate in the variable resistance region or constant current region to adjust the output current flowing through LED load 2, such that the average value of the output current flowing through LED load 2 may remain substantially constant to reduce current ripple that may be caused by the repeated turning on and off of switch Q1.

In particular embodiments, transistor Q2 can be a field-effect transistor, and parameters can be set such that transistor Q2 may operate in the variable resistance region when the voltage difference between the two power terminals of transistor Q2 is greater than the predetermined value. Therefore, during a period that rectifier circuit 2 can generate larger input current Iin to the power converter, transistor Q2 may operate in the variable resistance region, and output current Iled can gradually increase but be lower than the highest value, which is conducive to reduce current ripple.

Further, the parameters of transistor Q2 can be set such that transistor Q2 can operate in the variable resistance region when the voltage difference between the two power terminals of transistor Q2 is less than the predetermined value. In addition, transistor Q2 can operate in the constant current region when the voltage difference between the two power terminals of transistor Q2 is greater than the predetermined value. Thus, transistor Q2 can actively limit the output current flowing through LED load 2 when the conduction voltage drop is relatively large. Therefore, by configuration of the parameters of transistor Q2, the operating state of the circuit can be further optimized in order to reduce the current ripple that may be caused by repeated turn-on and turn-off of switch Q1.

For example, control circuit 3 can include compensation signal generating circuit 31, comparator CMP1, and single triggered circuit OS1. Compensation signal generating circuit 31 can generate compensation signal Vc based on reference voltage Vref and output current sampling signal Vs. Compensation signal Vc can characterize error information between an average value of the current flowing through transistor Q2 (or through LED load 2) and a desired current value. The current flowing through transistor Q2 can be sampled and converted into output current sampling signal Vs by resistor Rs. Compensation signal generating circuit 31 can include filtered average circuit AVG, error amplifier EA1, and a compensation circuit. The filtered average circuit can receive output current sampling signal Vs, and may generate an average signal representing the average of the current flowing through LED load.

Error amplifier EA1 can receive the averaged signal at one input terminal, and reference voltage Vref at another input terminal. An output error signal (which may be a voltage or a current) generated at the output terminal of error amplifier EA1 can be processed by the compensation circuit to be compensation signal Vc characterizing the error between the average value of current Iled flowing through LED load and the desired current value. The compensation circuit including capacitor C3 can achieve average operation for the output error signal by capacitor C3. It should be understood that the compensation circuit may also add resistor, inductor, and/or other capacitive components, depending on the type of the output signal of the error amplifier or different parameters of the circuit. Compensation signal Vc can be applied directly or indirectly (e.g., by a driver or buffer) to the control terminal of transistor Q2, thereby forming a current control loop to control the current flowing through transistor Q2 to be substantially constant. The ripple of the output current can be effectively reduced by the closed loop control.

Comparator CMP1 can receive input sampling voltage Vbus1 at one input terminal, and compensation signal Vc at another input terminal. An output terminal of comparator CMP1 can connect to single triggered circuit OS1. Comparator CMP1 can compare input sampling voltage Vbus1 against compensation signal Vc. For example, the LED driver can also include an input voltage sampling circuit for acquiring input sampling voltage Vbus1 by sampling input voltage Vbus. The input voltage sampling circuit can be a resistor divider circuit that divides input voltage Vbus by resistors R1 and R2 into voltage Vbus1 that is suitable for comparator CMP1. It should be understood that the input voltage sampling circuit may also be or include other types of circuits for real-time or periodic sampling of voltage. Alternatively, voltage Vbus1 can be generated by sampling the drain terminal of transistor Q2 or AC input voltage.

Single triggered circuit OS1 can generate a control signal in response to a transition (rising or falling edge) of the output signal of the comparator CMP1. The operation of single triggered circuit OS1 in response to the rising edge or the falling edge of the input signal depends on the direction of the level transition of the output signal of comparator CMP1 when input sampling voltage Vbus1 increases above compensation signal Vc. Single triggered circuit OS1 can be triggered to generate a high or low level pulse signal having time length/duration T1, thereby controlling switch Q1 to be turned off for time length T1. After the end of the pulse signal generated by single triggered circuit OS1, switch Q1 may again be turned on until the next pulse signal comes. Also, a logic circuit as shown in FIG. 3 can be provided between single triggered circuit OS1 and the control terminal of switch Q1 in order to enhance the level intensity of the pulse signal, and to perform the conversion between the high and low levels.

Figure 4:
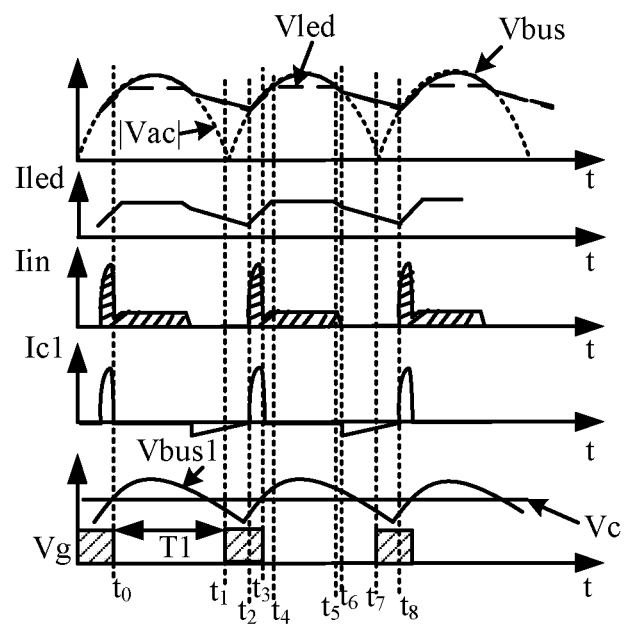
FIG. 4 is a waveform diagram of example operation of the example LED driver of FIG. 3, in accordance with embodiments of the present invention.

Referring now to FIG. 4, shown is a waveform diagram of example operation of the example LED driver of FIG. 3, in accordance with embodiments of the present invention. In this particular example, before time t0, control signal Vg for controlling switch Q1 is at a high level, switch Q1 can be turned on and capacitor C1 may effectively be connected to the input terminal of the power converter, such that rectifier circuit 1 can generate input current Iin to the LED driver to charge capacitor C1 while driving LED load 2 to operate, and input current Iin can remain high. Correspondingly, input voltage Vbus can be increased as capacitor C1 is charged. At time t0, since input sampling voltage Vbus1 following the change of input voltage Vbus is increased to be greater than compensation signal Vc, the output signal of comparator CMP1 may be switched, and single triggered circuit OS1 can generate a high-level pulse signal with a predetermined time length in response to the rising edge of the output signal of comparator CMP1, which can be converted to a low level by an inverter to control switch Q1 to be turned off for predetermined time length T1. Predetermined time length T1 may be set such that the absolute value of the AC input voltage of rectifier circuit 1 is less than input voltage Vbus when switch Q1 is turned on again. This can effectively prevent capacitor C1 from being charged immediately when switch Q1 is turned on again.

After time t0, switch Q1 can be turned off. Until time t1, predetermined time length T1 ends and switch Q1 may again be turned on. Since absolute value |Vac| of the AC input voltage of rectifier circuit 1 is less than voltage Vbus across the capacitor, rectifier circuit 1 can be turned off, and input current Iin may continue to be zero. Capacitor C1 can be discharged to drive LED load 2 through the body diode of switch Q1 or the unidirectional conduction circuit connected in parallel therewith. After time t1, capacitor C1 can effectively be connected to the LED driver and may generate discharging current Ic1 for driving LED load 2, such that input voltage Vbus can be decreased due to the discharging of the capacitor. Also, output current Iled flowing through LED load 2 may gradually decrease, and the voltage across LED load 2 may also decrease until time t2. At time t2, since input voltage Vbus can be decreased below absolute value |Vac| of the AC input voltage of rectifier circuit 1, and rectifier circuit 1 can generate the input current to the LED driver. Input current Iin can charge C1 while driving LED load 2 to operate, thereby causing input voltage Vbus to increase.

At time t3, input sampling voltage Vbus1 following the change of input voltage Vbus may increase to be greater than compensation signal Vc, such that the output signal of comparator CMP1 is switched again. Single triggered circuit OS1 can generate a high-level pulse signal with the predetermined time length in response to the rising edge of the output signal of comparator CMP1, in order to control switch Q1 to turn off for predetermined time length T1. After time t3, switch Q1 can be turned off, input current Iin may no longer charge capacitor C1, and input current Iin can drastically drop. Due to the influence of the sinusoidal half-wave signal waveform, the output signal of rectifier circuit 1 may continuously increase to drive LED load 2 to operate. This can cause output current Iled flowing through LED load 2 and voltage Vled across LED load 2 to continuously increase.

During time t2 and time t4, transistor Q2 can operate in the variable resistance region, such that current Iled can be controlled to gradually increase. This can cause voltage Vled to vary along with absolute value |Vac| of the AC input voltage. At time t4, output current Iled may increase to a predetermined threshold such that transistor Q2 switches to the constant current region. This can cause voltage Vled to no longer vary along with input voltage Vbus. Input voltage Vbus may follow the output signal of rectifier circuit 1 to increase to a peak value, and then decrease until time t5. During times t4 and t5, rectifier circuit 1 can continuously provide power to LED load 2. At time t5, absolute value |Vac| of the AC input voltage of rectifier circuit 1 may decrease below the voltage across capacitor C1, such that the diode of rectifier circuit 1 is turned off step by step, and input current Iin is decreased to zero at time t6. Capacitor C1 may begin to discharge to drive LED load 2 through the body diode of switch Q1 or the unidirectional conduction circuit connected in parallel therewith until time t7. At time t7, since the pulse signal ends, switch Q1 may again be turned on, capacitor C1 can effectively be connected to the input terminal of the power converter, and capacitor C1 may be discharged to drive the LED load until time t8.

When switch Q1 has no body diode or the parameters of the body diode are not suitable for the particular circuit, a unidirectional conduction circuit (not shown) connected in parallel with switch Q1 may be provided. When the absolute value of the AC input voltage is less than the input voltage, capacitor C1, transistor Q2, LED load 2, and the unidirectional conduction circuit can form a current loop circuit. For example, the unidirectional conduction circuit can be a diode. When input sampling voltage Vbus1 is increased to be greater than compensation voltage Vc, switch Q1 can be controlled to be turned off and then the input current can be prevented from charging capacitor C1. The input current can be concentrated in the time period during which input voltage Vbus and output voltage Vled are close to each other, while the input current is lower or zero during other time periods.

Thus, the voltage drop applied to other components of the LED driver connected in series with LED load 2 can be reduced, and the power consumption of the circuit system may accordingly be reduced. During time t2 to t6, that is, for most of the time in the power-frequency half-wave period, input current Iin may not be zero, such that the conduction angle of rectifier circuit 1 is expanded, and harmonic distortion can be reduced. In addition, the current ripple that may be caused by the frequent charging and discharging operation control can effectively be reduced by the constant current control for transistor Q2.

Figure 5:
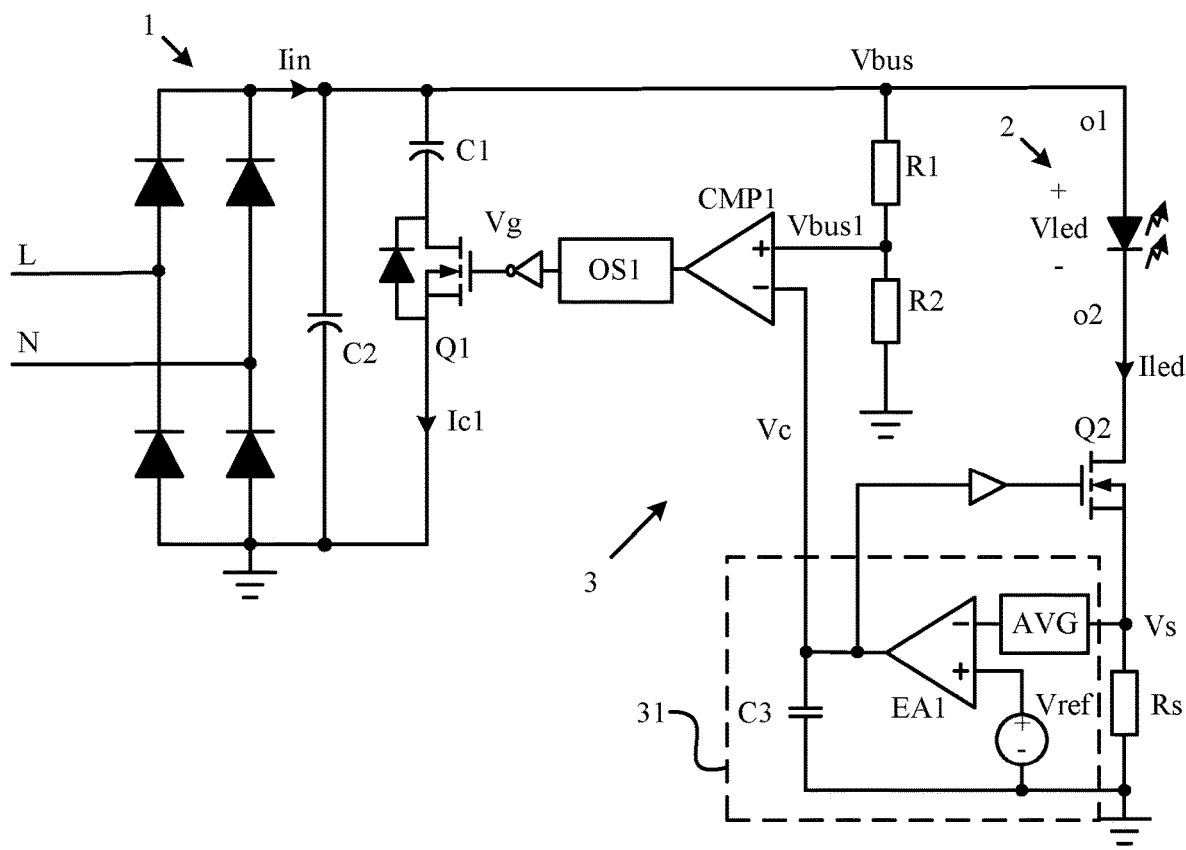
FIG. 5 is a schematic block diagram of a third example LED driver, in accordance with embodiments of the present invention.

Referring now to FIG. 5, shown is a schematic block diagram of a third example LED driver, in accordance with embodiments of the present invention. In this particular example, capacitor C2 may be provided to connect between input terminal i of the power converter and the ground terminal as a supplement for capacitor C1. For example, the capacitance value of capacitor C2 may be substantially less than the capacitance value of capacitor C1. Capacitor C2 can provide a current when capacitor C1 is unable to supply power to the subsequent stage circuits due to switch Q1 being turned off.

In one embodiment, a method of controlling an LED driver, can include: (i) obtaining a sampling voltage representing an input voltage of a power converter of the LED driver, where the power converter includes a switch and a first capacitor coupled in series between output terminals of a rectifier circuit; and (ii) controlling the switch to be turned off for a time length in each power frequency half-wave period to reduce a charging time of the first capacitor.

Figure 6:
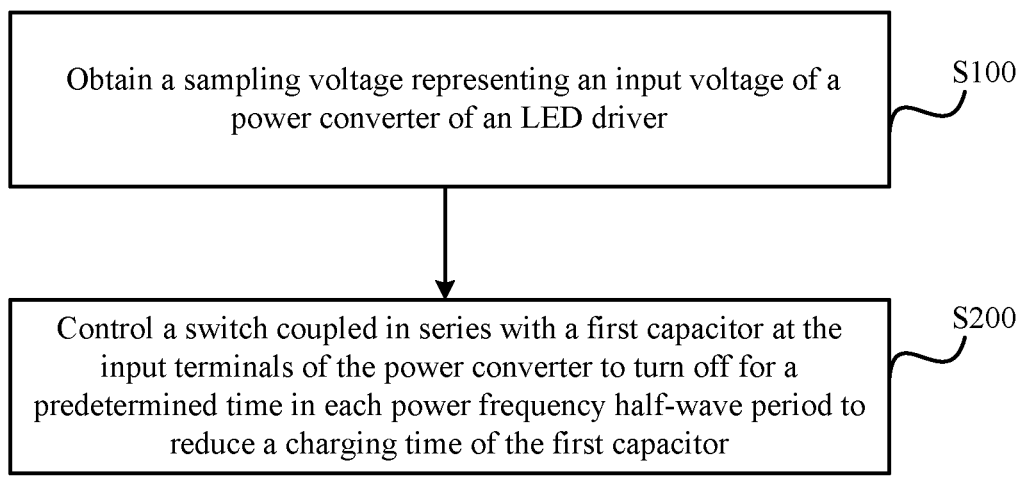
FIG. 6 is a flow diagram of an example control method of the LED driver, in accordance with embodiments of the present invention.

Referring now to FIG. 6, shown is flow diagram of an example control method of the LED driver, in accordance with embodiments of the present invention. In this example, at S100, an input sampling voltage characterizing an input voltage of the power converter of the LED driver can be generated. At S200, a switch coupled in series with a capacitor at the input terminals of the power converter can be controlled to turn off for a predetermined time in each power frequency half-wave period in accordance with the input sampling voltage, in order to reduce the charging time of the capacitor. For example, the switch can be controlled to turn off for the predetermined time in each power frequency half-wave period, such that the input current can be concentrated in a time period during which a voltage difference between the two power terminals of a transistor is relatively small. That is, a voltage difference between the input voltage and output voltage of the power converter is relatively small.

Alternatively, when the voltage difference between the two power terminals of the transistor is less than a predetermined value, and during at least part of a time period that an absolute value of the AC input voltage is not less than the input voltage, the switch can be controlled to turn on period when the voltage difference between the two power terminals of the transistor is greater than the predetermined value, the switch can be controlled to turn off. For example, the switch can be controlled to turn off for the predetermined time when the input sampling voltage is increased to be greater than a compensation signal, where the input sampling voltage characterizes the input voltage. The compensation signal can characterize error information between a current flowing through the LED load and a desired current value. The predetermined time may be set such that an absolute value of an AC input voltage of the rectifier circuit is less than the input voltage when the switch is turned on again.

In particular embodiments, a capacitance value of the input terminal of the LED driver can be changed by controlling the on-off state of the switch connected in series with the capacitor in each power frequency half-wave period. In this way, the waveform of the input current can be widened, the harmonic distortion may be reduced, and the power factor can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power converter configured for a light-emitting diode (LED) driver, the power converter comprising:
    a) an input capacitor circuit comprising a first capacitor and a switch coupled in series between input terminals of said power converter, and being configured to receive an output signal of a rectifier circuit;
    b) a transistor coupled in series with an LED load; and
    c) a control circuit configured to control said switch to regulate a capacitance value of said input capacitor circuit to regulate an input current of said power converter, and to control said transistor to regulate a current flowing through said LED load.

2. The power converter of claim 1, wherein said control circuit is configured to control said switch to turn on and off alternately in each power frequency half-wave period.

3. The power converter of claim 2, wherein:
    a) said control circuit is configured to control said switch to be turned off for a time length in each power frequency half-wave period to reduce a charging time of said first capacitor; and
    b) said time length is a predetermined time duration.

4. The power converter of claim 2, wherein said control circuit is configured to control said switch to be turned off for a predetermined time such that an input current of said power converter is substantially concentrated during a time period during which a voltage difference at two power terminal of said transistor is less than a predetermined value.

5. The power converter of claim 2, further comprising a unidirectional conduction circuit coupled in parallel with said switch, wherein said unidirectional conduction circuit, said first capacitor, said transistor, and said LED load form a current loop circuit when an absolute value of an alternating current input voltage of said rectifier circuit is less than an input voltage of said power converter.

6. The power converter of claim 2, wherein:
    a) said control circuit is configured to control said switch to be turned on when a voltage difference between the two power terminals of said transistor is less than a predetermined value;
    b) an absolute value of an alternating current input voltage of said rectifier circuit is not less than an input voltage of said power converter for at least part of a time when said switch is turned on; and
    c) said switch is controlled to be turned off when said voltage difference is greater than said predetermined value.

7. The power converter of claim 6, wherein said transistor is a field-effect transistor.

8. The power converter of claim 7, wherein:
    a) said transistor operates at a constant current region when said voltage difference is greater than said predetermined value; and
    b) said transistor operates at a variable resistance region when said voltage difference is less than said predetermined value.

9. The power converter of claim 4, wherein:
    a) said control circuit is configured to control said switch to be turned off for said time length when an input sampling voltage is increased to be greater than a compensation signal;
    b) said input sampling voltage characterizes an input voltage of said power converter; and
    c) said compensation signal characterizes error information between said output current and a desired current value.

10. The power converter of claim 9, wherein said time length is set such that an absolute value of an alternating current input voltage of said rectifier circuit is less than said input voltage of said power converter.

11. The power converter of claim 9, wherein said control circuit comprises:
    a) a compensation signal generating circuit configured to generate said compensation signal in accordance with said input sampling voltage and a reference voltage, wherein said compensation signal is used to control said transistor, and said input sampling voltage is used to characterize one of said output current and said input current;
    b) a comparator configured to receive said input sampling voltage at a first input terminal, and said compensation signal at a second input terminal; and
    c) a single triggered circuit configured to generate a control signal in response to a transition of an output signal of said comparator.

12. The power converter of claim 2, wherein said power converter further comprises a second capacitor coupled between said input terminals.

13. The power converter of claim 2, wherein said switch comprises a transistor having a body diode.

14. The power converter of claim 1, wherein said LED load is coupled between output terminals of said power converter without an output capacitor connected thereto.

15. The power converter of claim 1, wherein said capacitance value of said input capacitor circuit is regulated in accordance with a compensation signal representing error information between said output current and a desired current value and an input voltage of said power converter.

16. A method of controlling a light-emitting diode (LED) driver, the method comprising:
    a) obtaining a sampling voltage representing an input voltage of a power converter of said LED driver, wherein said power converter comprises a switch and a first capacitor coupled in series between output terminals of a rectifier circuit;
    b) controlling, by a control circuit, said switch to be turned off for a time length in each power frequency half-wave period to reduce a charging time of said first capacitor; and
    c) controlling, by said control circuit, a transistor to regulate a current flowing through an LED load, wherein said transistor is coupled in series with said LED load.

17. The method of claim 16, wherein said switch is controlled to be turned off for said time length, such that an input current of said LED driver is substantially concentrated during a time period in which a voltage difference at two power terminals of a transistor is less than a predetermined value.

18. The method of claim 17, wherein:
a) said switch is turned on when a voltage difference between said two power terminals of said transistor is less than said predetermined value;
b) an absolute value of an alternating current input voltage of said rectifier circuit is not less than an input voltage of said power converter for at least part of a time duration when said switch is turned on; and
c) said switch is controlled to be turned off when said voltage difference is greater than said predetermined value.

19. The method of claim 17, wherein:
a) said switch is turned off for said time length when an input sampling voltage is increased to be greater than a compensation signal;
b) said input sampling voltage characterizes an input voltage of said power converter; and
c) said compensation signal characterizes an error information between said output current and a desired current value.

20. The method of claim 17, wherein said time length is set such that an absolute value of the alternating current input voltage of said rectifier circuit is less than an input voltage of said power converter.

* * * * *